Nov. 14, 1950     A. T. KLINGEBIEL     2,529,558
DUMPING BODY

Filed Jan. 19, 1948     2 Sheets-Sheet 1

ANTHONY T. KLINGEBIEL,
INVENTOR.

BY Donald E. Windle
ATTORNEY.

Nov. 14, 1950        A. T. KLINGEBIEL        2,529,558
DUMPING BODY
Filed Jan. 19, 1948        2 Sheets-Sheet 2
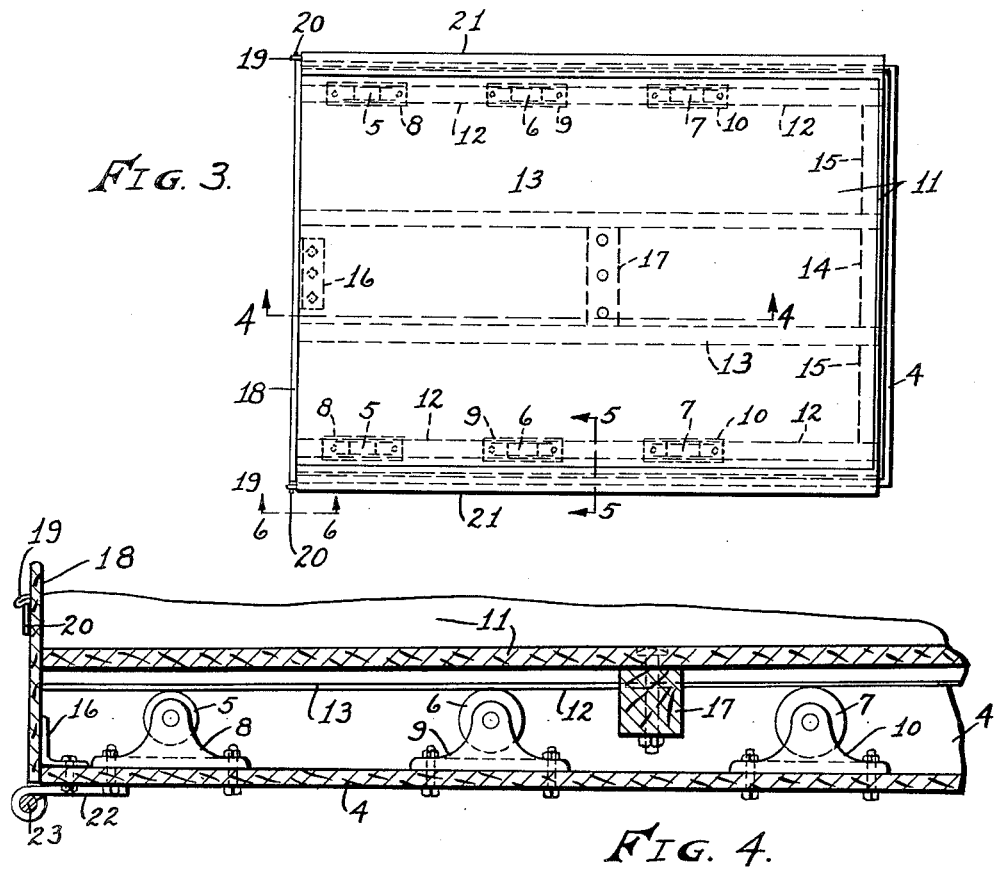
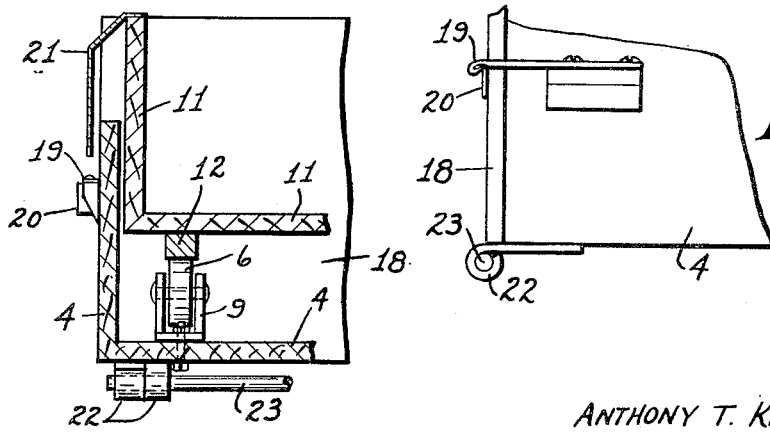
ANTHONY T. KLINGEBIEL,
INVENTOR.
BY Donald E. Windle
ATTORNEY.

Patented Nov. 14, 1950

2,529,558

UNITED STATES PATENT OFFICE 2,529,558

DUMPING BODY

Anthony T. Klingebiel, Richmond, Ind.

Application January 19, 1948, Serial No. 3,065

4 Claims. (Cl. 298—14)

1

This invention relates to bodies for carrying materials, and with means provided in connection therewith rendering the body substantially automatic in its dumping action. Bodies for analogous purposes have been devised and having in connection therewith means for raising one end thereof to accomplish dumping operations. In my present invention, no hoisting means is employed in the dumping operation thereof, the dumping operation being accomplished by the use of gravity.

The principal object of the invention is the provision of a body member having means whereby the release of restraining means of longitudinal movement thereof causes movement longitudinally of the body, and with means being provided in connection therewith arresting the longitudinal movement of the body.

A second object is the provision of a dumping body which, when released for longitudinal movement, travels to a dumping position without the use of hoisting or other urging means.

A third object is the provision of a dumping body which is readily adaptable for use in connection with trucks or other vehicles already provided with bodies.

Another object is the provision of a dumping body having a minimum number of parts in the construction thereof.

A further object is the provision of a dumping body which is simple of construction and operation, and which is economical to manufacture.

Other particular objects and advantages of the invention will suggest themselves in the course of the following description, and that which is new will be pointed out in the appended claims.

The preferred and most satisfactory manner of carrying out the principles of the invention is shown in the accompanying drawings, in which:

Figure 3 is a detail plan view, taken from line 3—3 of Figure 1.

Figure 4 is a detail longitudinal section through a portion of the body, taken on line 4—4 of Figure 3.

Figure 5 is a detail section through one side of the device, as taken on line 5—5 of Figure 3.

Figure 6 is a detail elevation taken from line 6—6 of Figure 3, and showing the end gate latching mechanism.

Like characters of reference denote like parts throughout the several views.

Figure 1:
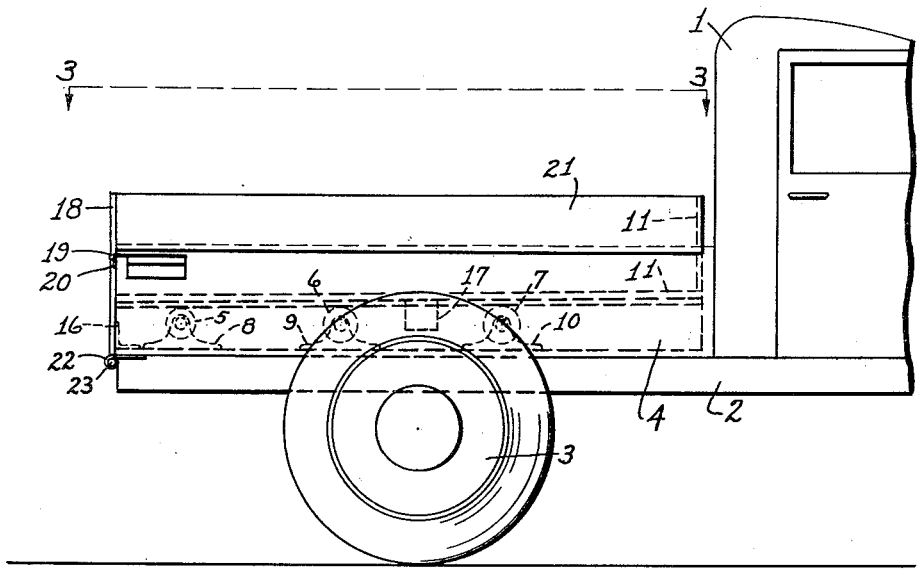
Figure 1 is a partial side elevation of a truck or other vehicle having a body in connection therewith embodying the features of the invention.

In order that the advantages and the novel features of the invention may be more fully apparent and understood, I will now take up a detailed description thereof in which the same will be more fully set forth.

Referring now to the drawings in detail, numeral 1 designates a cab member of a conventional truck, with the cab being mounted on a frame 2 in the usual manner, and with the frame being supported by means of wheels 3 in the conventional manner. 4 designates a fixed body of conventional design with the same being rigidly secured to the frame 2 by means of bolts or other suitable fastening means.

Arranged within the body 4 and located near each side thereof are three rollers 5, 6, and 7, with the same being spaced apart in longitudinal relation, and with the smallest roller 5 being located nearest the rear end of the body 4, and with roller 7 being located nearest the forward end of the body. Roller 6 is located in longitudinal alignment with rollers 5 and 7 and is located substantially midway therebetween. Rollers 5, 6, and 7 are of graduated sizes and are supported in suitable housings 8, 9, and 10 respectively, and which are rigidly secured through the bottom or floor of body 4. It is important that each of rollers 5, 6, and 7 be located in tangential alignment with the other rollers in the same line.

Located within the conventional fixed body 4 is the dumping body 11, with the dumping body having a track member 12 secured on the under side of the bottom thereof and in alignment with a series of rollers 5, 6, and 7. It will be noted, by reference to the several figures that there is no rear end in dumping body 11.

Longitudinally-extending spaced-apart reinforcing members 13 are located on the under side of the floor of the dumping body 11 and are secured therethrough by any suitable means. An additional reinforcing member 14, extending laterally of the body and extending between the reinforcing members 13, may be employed. Additional members 15 may be used between the forward ends of reinforcing members 13 and respective tracks 12.

An angle or other suitable stop member 16, of suitable length to fit freely between reinforcing members 13, is rigidly secured to the rear end portion of body 4. A stop block 17 is secured between reinforcing members 13 and is located substantially midway longitudinally of dumping body 11. The stop block is of sufficient height to strike against angle stop member 16 when the body 11 is permitted to move rearwardly with relation to body 4.

Figure 2:
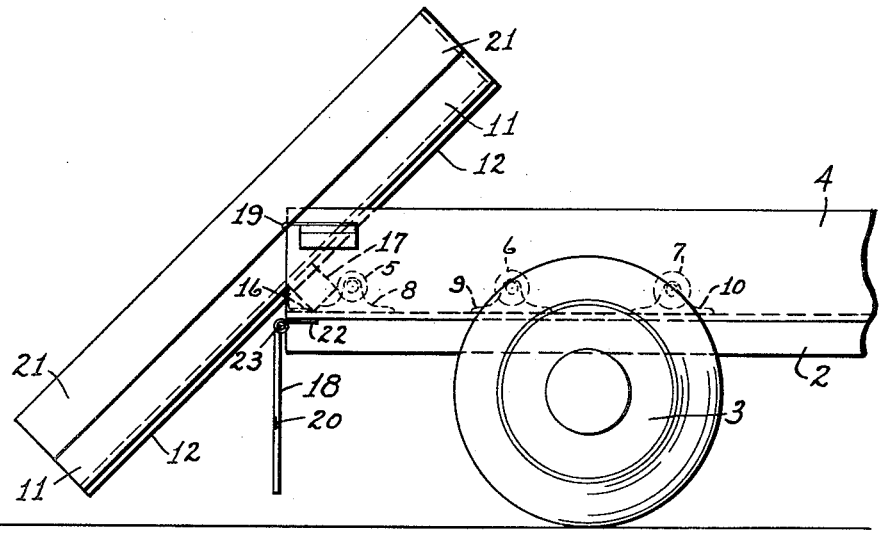
Figure 2 is a partial side elevation similar to that shown in Figure 1, but with the dumping body being shown in dumping condition.

Body 4 is provided, at the rear end thereof, with an end gate member 18 which is hingedly secured to the body 4 by means of hinge straps 22 and rod 23 in the usual manner. A latch keeper member 19 is located at each side of body 4, with the same being adapted to engage a respective latch bar 20 which is secured to the end gate and projects laterally therefrom, as more clearly shown in Figures 4, 5, and 6. Each side member of dumping body 11 is provided with a guard member 21 which overlaps the respective side members of the body 4, as shown in Figures 1, 2, 3, and 5, and which prevents dirt or other foreign matter from falling into body 4 at its sides.

Operation

With the body in the position as shown in Figures 1, 3, 4 and 5, and with the same being filled with material such as gravel, the latch keeper member 19 at each end of end gate member 18 is disengaged from its respective latch bar 20. With the body being loaded and with the tracks 12 resting on rollers 5, 6, and 7, the dumping body 11 rolls in a rearward direction with relation to body 4. The dumping body 11 moves rearwardly until the stop block 17 engages the stop angle 16 whereupon the longitudinal movement of the dumping body is arrested and the rear end of the dumping body tilts downwardly to the position shown in Figure 2 by reason of the load therein and with the force of the load travelling rearwardly. After the load has been dumped, the rear end of the dumping body is raised manually and pushed forwardly to its original position after which the end gate 18 is swung to its closed position and with the latch keepers 19 engaging the latch bars 21 and maintaining the same in closed condition until again released.

It is obvious that the latch keepers may be arranged to be tripped by means of rods or other means extending into the cab of the vehicle. It is also obvious that the dumping body may be drawn to its normal position by means of tension springs having one end thereof secured to the under side of the dumping body and having the opposite ends thereof secured at the forward end of the fixed body 4. Means secured to the end gate and extending into the cab of the vehicle can also be supplied to close the end gate member.

As shown in the drawings, the upright sides of the fixed body 4 form guides against lateral movement of the dumping body. While the dumping body is shown as being confined laterally between the sides of the fixed body 4, it is obvious that the dumping body might be used by providing a vehicle with rollers and suitable guides instead of using a fixed body member.

Should it be desired to remove the dumping body entirely from the fixed body, the dumping body is moved rearwardly in the fixed body until the stop block contacts the stop angle, after which the rear end of the dumping body may be lifted to permit the stop block to clear the stop angle, and after which the dumping body may be removed from the fixed body by rearward longitudinal movement.

I desire that it be understood that the invention is shown and described in its most simple form, and that minor changes may be made in the several parts comprising the same, insofar as the changes thereto may fall within the scope of the appended claims.

Having now shown and described the invention, what I claim, is:

1. In combination, a fixed body having a hinged end gate releasably secured to one end thereof, a dumping body located within the fixed body, means supporting the dumping body for longitudinal movement, a stop member located in the fixed body adjacent the end gate thereof, a stop block carried by the dumping body and adapted to engage the stop member, with the engagement of the stop block with the stop member in longitudinal movement of the dumping body arresting the longitudinal movement of the dumping body and permitting the dumping body to tilt to a dumping position, and with the hinged end gate of the fixed body providing means releasably securing the dumping body in the fixed body.

2. In combination, a vehicle having a body in fixed relation therewith, a dumping body located within the fixed body, rollers mounted above and secured to the floor of the fixed body with the rollers being arranged in two rows with each row being located near a side of the fixed body, tracks secured to the under side of the dumping body with each of the tracks being adapted to contact a row of rollers, an angle stop member secured to the floor of the fixed body near the rear end thereof, a stop block secured to the under side of the dumping body in longitudinal alignment with the angle stop member, an end gate hingedly secured to the rear end of the fixed body and engaging the rear end of the dumping body, means releasably securing the end gate in closed position, with the release of the end gate permitting the dumping body to roll rearwardly on the rollers, with the engagement of the stop block of the dumping body with the angle stop member of the fixed body arresting the longitudinal movement of the dumping body and permitting the dumping body to assume a dumping position with relation to the fixed body.

3. In combination, a fixed body having two longitudinal rows of rollers secured to the bottom thereof, an upstanding angle stop member rigidly secured to the bottom of the fixed body near the rear edge thereof, a dumping body positioned within the fixed body, a pair of tracks secured to and depending from the under side of the dumping body and adapted to engage the rollers, a stop block secured to and depending from the under side of the dumping body and positioned in longitudinal alignment with the upstanding angle stop, an end gate hingedly secured to the rear end of the fixed body and providing means closing the rear end of the dumping body, and with said end gate providing means releasably securing the dumping body within the fixed body.

4. The combination of a dumping body located within a fixed body, said dumping body being movable from its normal position rearwardly within the fixed body, upstanding rollers secured to the floor of the fixed body, tracks secured to and depending from the bottom of the dumping body, with each of the tracks riding on a series of rollers, an upstanding angle stop member secured through the floor of the fixed body and located near the rear edge thereof, a stop block secured to and depending from the dumping body and positioned in longitudinal alignment with the angle stop member, a hinged end gate secured to the rear end of the fixed body, with the hinged end gate providing means releasably securing the dumping body in the fixed body, and with the release of the end gate permitting rearward movement of the dumping body with relation to the fixed body.

ANTHONY T. KLINGEBIEL.

REFERENCES CITED

The following references are of record in the file of this patent:

UNITED STATES PATENTS

| Number | Name | Date |
|---|---|---|
| 437,885 | Bryant | Oct. 7, 1890 |
| 549,954 | Bunnell | Nov. 19, 1895 |
| 777,020 | Hampton | Dec. 6, 1904 |
| 845,100 | Kohout | Feb. 26, 1907 |
| 1,389,642 | George | Sept. 6, 1921 |
| 1,892,029 | Alexander | Dec. 27, 1932 |
| 2,195,995 | Pabian | Apr. 2, 1940 |

FOREIGN PATENTS

| Number | Country | Date |
|---|---|---|
| 24,692 | France | Sept. 28, 1922 |